United States Patent Office 2,808,686
Patented Oct. 8, 1957

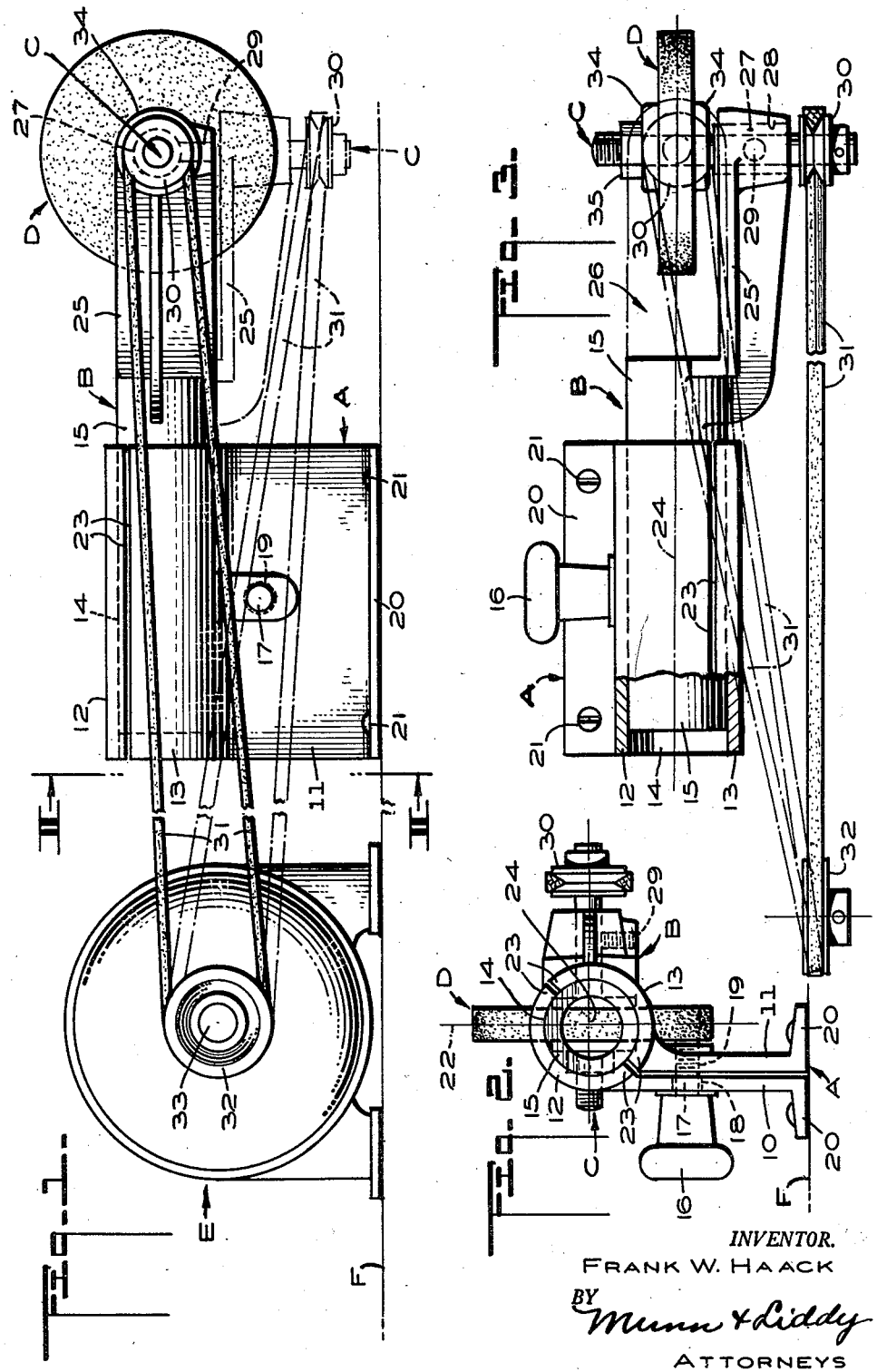

2,808,686

ADJUSTABLE ARBOR AND CLAMP-STANDARD FOR POWER-DRIVEN TOOLS

Frank W. Haack, Petaluma, Calif.

Application January 9, 1956, Serial No. 558,051

1 Claim. (Cl. 51—166)

The present invention relates to improvements in an adjustable arbor and clamp-standard for power-driven tools. It consists of the combinations, constructions and arrangement of parts, as hereinafter described and claimed.

An object of my invention is to provide an adjustable arbor and clamp-standard for power-driven tools, which is adapted for supporting a large variety of tools, such as grinding wheels, rotatable saws, buffers, sanding discs, chucks and shaper heads. The arbor may be swung into various angular positions, thereby changing the direction in which the tools extend, and without interfering with the drive for the tools.

More specifically stated, I provide a clamp-standard having a pair of coacting jaws, which are adapted to embrace a cylindrical member of a tool-supporting arbor. This member may be extended, retracted or rotated relative to the standard. Moreover, the arbor provides an offset arm on which a driven spindle is mounted, this spindle being made to support and drive the selected tool. The spindle may be adjusted so that the tool will be arranged axially relative to the cylindrical member of the arbor.

Another object of the invention is to provide a clamp-standard, which is arranged in such a manner as to allow the spindle to be shifted into any angular arrangement between vertical and horizontal, without the standard interfering with a belt drive, the latter extending from a motor disposed on the opposite side of the standard from that of the spindle.

Other objects and advantages will appear as the specification continues. The novel features will be set forth in the claim hereunto appended.

*Drawing*

For a better understanding of the invention, reference should be had to the accompanying drawing, forming part of this specification, in which:

Figure 1 is a side elevation of my adjustable arbor and clamp-standard for power-driven tools, the full lines disclosing the spindle for the tools as being arranged horizontally, while the dot-dash lines indicate the adjustable arbor as being swung until the spindle is disposed vertically.

Figure 2 is an end elevational view of the arbor and standard, as observed from the vertical plane II—II of Figure 1; and Figure 3 is a top plan view of Figure 1, portions of the clamp-standard being disclosed in section and the motor omitted.

While I have shown only the preferred form of my invention, it should be understood that various changes, or modifications, may be made within the scope of the annexed claim without departing from the spirit thereof.

*Detailed description*

Referring to the drawing in detail, it will be noted that I provide a clamp-standard indicated generally at A, which carries an adjustable arbor B. The latter has a spindle C mounted thereon, which is adapted to support and drive a preselected tool D, the tool being actuated by a motor E.

In its structural features, the clamp-standard A defines plate-like base members 10 and 11 having semi-cylindrical coacting jaws 12 and 13, respectively, formed on the upper portions thereof. These jaws are arranged in confronting relation with one another, as illustrated in Figure 2, and define a horizontal bore 14 into which a cylindrical member 15 of the arbor B may be telescoped.

It will be quite apparent that the member 15 may be extended, retracted or rotated relative to the clamp-standard A. For the purpose of clamping this arbor member in adjusted position, a hand-screw 16 has been provided. The threaded shank 17 of this screw passes through an unthreaded opening 18, which is fashioned in the base member 10, and the outer end of the shank is threaded into an opening 19 formed in the base member 11 (see Figure 2). The members 10 and 11 are spaced a slight distance from one another so that their jaws 12 and 13, respectively, may be drawn tightly against the cylindrical member 15, when the hand-screw 16 is tightened.

In order to screw the clamp-standard B to a worktable F, or other support, the lower ends of the base members 10 and 11 are provided with feet 20, which may be secured to the table by any suitable means, such as screws 21 (see Figures 1 and 3).

With particular reference to Figure 2, it will be noted that both of the base members 10 and 11 are disposed laterally of a vertical plane 22, which passes through the longitudinal axis of the cylindrical member 15 of the adjustable arbor B. Moreover, both base members are arranged on the same side of this vertical plane, and the purpose of such a structural feature will be set forth as the specification continues. The longitudinal confronting edges 23 of the jaws 12 and 13 are disposed on an inclined plane, which extends at substantially 45° through the axis 24 of the arbor member 15. Thus, both of the jaws will have ample bearing surface on the arbor member, while permitting the base members 10 and 11 to be offset laterally to one side of the vertical plane 22 (see Figure 2).

As disclosed in Figures 1 and 3, the adjustable arbor B includes an arm 25 projecting forwardly from the cylindrical member 15, and offset laterally with respect to the longitudinal axis 24 of the latter. This arrangement presents a recess 26 in which the tool D may be accommodated, with the tool being disposed to coincide with the axis 24.

The spindle C, previously mentioned, is journalled in a bearing 27, which is mounted in a bore 28 that extends at right angles to the axis 24. This bearing may be adjusted endwise in the bore 28, thus allowing the tool D to be disposed in coincidence with the axis 24. A set-screw 29 is provided to anchor the bearing 27 in adjusted position.

For rotating the spindle C, it is provided with a driven pulley 30, over which a belt 31, or other suitable driving element, is trained. This belt passes around a drive pulley 32, which is fastened to the shaft 33 of the motor E, or other source of motive power. Of course, the arbor member 15 may be adjusted axially in the bore 14 of the clamp-standard A so that the belt will be maintained under the proper tension.

The spindle C has been shown in full lines in Figures 1 to 3, inclusive, as being horizontally disposed. However, it will be apparent from the dot-dash lines in Figures 1 and 3, that the adjustable arbor B may be rotated, after loosening the hand-screw 16, until the spindle C is disposed vertically, with the pulley 30 being arranged below the offset arm 25.

This will cause the belt 31 to twist between the pulleys 30 and 32, with the reaches of the belt extending underneath the jaw 13. In order to provide ample clearance for the belt, the base members 10 and 11 have been offset to one side of the vertical plane 22, in the manner described earlier. When turning the spindle into vertical position, the arbor B may be retracted relative to the clamp-standard A, and thus the belt will have the proper length.

As stated in the objects of the invention, the tools D may consist of a grinding wheel (as illustrated), rotatable saws, buffers, sanding discs, chucks, shaper heads, etc. These tools may be clamped between a pair of collars 34, provided on the spindle C, by a nut 35, which is threaded onto the spindle.

I claim:

In combination: a pair of vertically-extending base members secured to a common support and spaced a slight distance apart; each base member having an integral, semi-cylindrical jaw at its upper end that is offset so that the confronting edges of the two jaws will substantially lie in a plane that extends upwardly at an angle to a second vertical plane that lies in the space between the two base members; whereby the horizontal common axis of the pair of jaws will be offset from the said second vertical plane and will provide a space directly under the jaws; an arbor having a cylindrical portion slidably and rotatably received in the bore provided by the two semi-cylindrical jaws; an end of the cylindrical portion extending beyond an end of the pair of jaws and having an arm which is offset from the cylindrical member and is integral therewith, said arm extending parallel to the common axis of the pair of jaws; a spindle rotatably carried by the arm and extending transversely to the cylindrical portion; the axis of the spindle intersecting the said common axis of the pair of jaws; whereby a tool mounted on the spindle can be centered with respect to the said common axis; a pulley mounted on the spindle and at the opposite end from that which carries the tool; a motor positioned at the opposite end of the pair of jaws from that beyond which the cylindrical member extends and having a pulley that lies in the same plane as the spindle pulley when the spindle is in a horizontal position; a belt operatively connecting the two pulleys together and lying close to the semi-cylindrical jaws; clamping means applied to the base members for drawing them together for causing the semi-cylindrical jaws to clamp and frictionally hold the cylindrical portion of the arbor from rotational or longitudinal movement; said clamping means adapted to be loosened for permitting the arbor to be moved longitudinally and be rotated through an arc up to 90°, the spindle pulley being swung downwardly through an arc during this rotational movement and portions of the endless belt being moved into the space provided under the jaws; said clamping means again being tightened after such adjustment to hold the cylindrical member in place.

References Cited in the file of this patent

UNITED STATES PATENTS 2,359,209     Ellinwood _____ Sept. 26, 1944

FOREIGN PATENTS

34     Great Britain _____ Jan. 1, 1896
116,748     Great Britain _____ June 17, 1918